Sept. 24, 1929.  F. A. HODGE  1,729,581
CONVERTER
Filed May 21, 1928

Frederick A. Hodge
INVENTOR.

BY Robert Ames Norton
ATTORNEY

Patented Sept. 24, 1929

1,729,581

UNITED STATES PATENT OFFICE

FREDERICK A. HODGE, OF PITTSBURGH, PENNSYLVANIA, ASSIGNOR TO THE SELDEN COMPANY, OF PITTSBURGH, PENNSYLVANIA, A CORPORATION OF DELAWARE

CONVERTER

Application filed May 21, 1928. Serial No. 279,329.

This invention relates to converters for vapor phase catalysis and more particularly to converters which are cooled by reaction gases.

In the co-pending application of A. O. Jaeger and J. A. Bertsch, Serial No. 100,818, filed April 9, 1926, there is described a type of converter in which double countercurrent heat exchangers are embedded in a catalyst layer and the reaction gases pass through the heat exchangers, which consist of open end tubes inserted into closed end tubes, first passing downwardly in indirect heat exchanging relation with the contact mass, then after emerging from the open end tubes passing upwardly in the annular space between the open end tubes and the closed end tubes in direct heat exchanging relation with the contact mass and with the incoming gases on reverse flow. Then after a second reversal of flow they pass through the contact mass itself. An extraordinarily efficient control of reaction temperature is thereby maintained since, of course, the cooling effect of the reaction gases varies within wide limits directly with the amount of reaction gases passing through and the heat evolved in the reaction, where the latter is exothermic, or the heat absorbed where it is endothermic also varies in proportion to the amount of gas passing through. Thus the cooling capacity varies directly as the amount of heat evolved and automatic control is obtained throughout the zones of the contact mass which are sufficiently close to the tubes to effectively transfer their heat to the heat exchange elements.

The design shown in the above referred to application in which round tubes are used possesses a serious disadvantage. The catalyst spaces between the various elements are not uniform for it is impossible to arrange any circular elements so as to give uniform minimum distances between all points of the circle peripheries and those of adjacent circles. Thus there are portions of the contact mass arranged in a very thin layer between two heat exchange elements where circles approach each other most nearly and other portions of the contact mass are present in thicker layers between the heat exchange elements where the circles approach each other less closely. This is a serious disadvantage because in reactions which are highly exothermic, such as, for example the contact sulfuric acid process, or even more delicate reactions, such as, the oxidation of organic compounds, it is essential to maintain catalyst temperature with great accuracy. The use of circular elements is relatively less satisfactory in such installations because if the maximum distance between circles is chosen small enough to give adequate heat exchange the minimum distance is too small to leave suffifficient catalyst. In other words, circular elements in order to achieve a satisfactory maximum catalyst thickness between elements must be so closely spaced as to be impractical for most reactions and are uneconomical in all cases as part of the catalyst is being cooled more intensely than other parts.

The present invention avoids all disadvantages incident to the converters provided with circular heat exchange elements and at the same time retains their advantages. According to the present invention the closed end external heat exchange elements are in the form of regular hexagons the internal tubes being either round or hexagonal, but preferably round. The hexagonal tubes can be placed so as to give an absolutely uniform spacing between their sides and will, therefore, complete-control even the most strongly exothermic catalytic reactions with uniformly close spacing without the waste which occurs when round tubes are used. A very marked increase in effectiveness is obtained and the loading and reliability of operation of converters using hexagonal heat exchange elements of the present invention is markedly better than those using round elements. A further feature of the present invention consists in an improved method of fastening the closed end hexagonal heat exchange elements to the internal tubes which presents many advantages in cheapness, simplicity and reliability over the bayonet joints shown in the Jaeger and Bertsch application above referred to and this method of fastening constitutes an additional feature in the present invention in its preferred embodiment.

The drawings illustrate only a simple converter without any accessories and without any modifications for the introduction of additional cooling air, mixing of reaction gases, and the like which are shown in the figures of the drawing in the Jaeger and Bertsch application referred to above. It should be clearly understood that all these modifications of circulation may be embodied in converters using the hexagonal heat exchange elements of the present invention but as these circulation modifications are not claimed by themselves as new in the present invention they are not specifically illustrated, it being understood, however, that they are included.

The gas cooled converters with hexagonal heat exchange elements which forms the subject matter of the present invention may be used as single converters in certain reactions where this is satisfactory. In other reactions where it is desirable to carry out the reaction in two steps or at different temperatures a plurality of units may be used in series, the automatically gas cooled unit being placed where the maximum heat evolution takes place and suitable intercooling means being provided. I do not claim this arrangement of a plurality of units broadly, this forming the subject matter of a patent of A. O. Jaeger, No. 1,660,511. On the contrary this arrangement is only claimed when used with automatically gas cooled converters using hexagonal heat exchange elements of the present invention. It should be understood that the intercooling means may be in the form of a separate unit formed between two converters in series or it may be an internal heat exchanger or intercooler in the case of converters where both of the different catalyst zones are arranged in a single shell in order to effect a more compact construction.

It is desirable to compensate for the cooling due to the converter shell in order to prevent over cooling in the external portions of the catalyst or under cooling the central portion of the converter. For this reason the cooling capacity of the heat exchange elements may be varied from the center to the outside or their placement may be varied as described in the co-pending application of A. O. Jaeger, Serial No. 144,496, filed October 27, 1926. It should be understood that this method of compensating for converter shell cooling is not claimed generally in the present application but only when used with converters having the hexagonal heat exchange elements of the present invention. When hexagonal heat exchange elements are used with the circular shell the spacing on the outside is automatically varied because the outer row of hexagonal tubes of course does not form a circle. This is shown in Fig. 2 in a very greatly exaggerated form because the size of the converter shell in comparison with the heat exchange elements is very small in order to illustrate the drawing more clearly. For many purposes greater catalyst thickness between the heat exchange elements and the shell periphery will compensate for the effect of shell cooling but this compensatory effect may also be combined with variation in the placement or cooling capacity of the central heat exchange elements as described in the above referred to application of A. O. Jaeger.

Where it is desired to use a variation in the amount of gas flowing through the elements as the only compensatory control a hexagonal shell can be used instead of a circular shell. This type of shell is less satisfactory to build and does not show as great strength as a circular shell but for some purposes the more exact uniformity of placing of the heat exchange elements around the periphery make such a shall desirable and it is understood that shells of any shape are included in the present invention.

Figure 2:
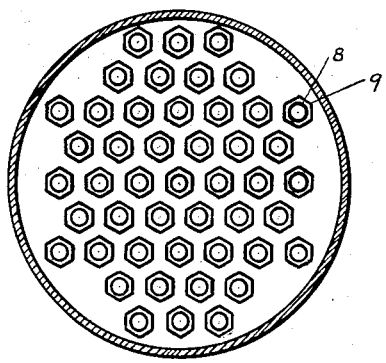
Fig. 2 is a horizontal section along the line of 2—2 of Fig. 1.
Figure 4:
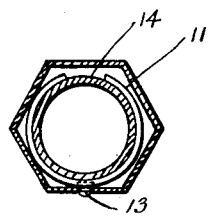
Fig. 4 is a horizontal section of Fig. 3 along the line of 4—4.
Figure 1:
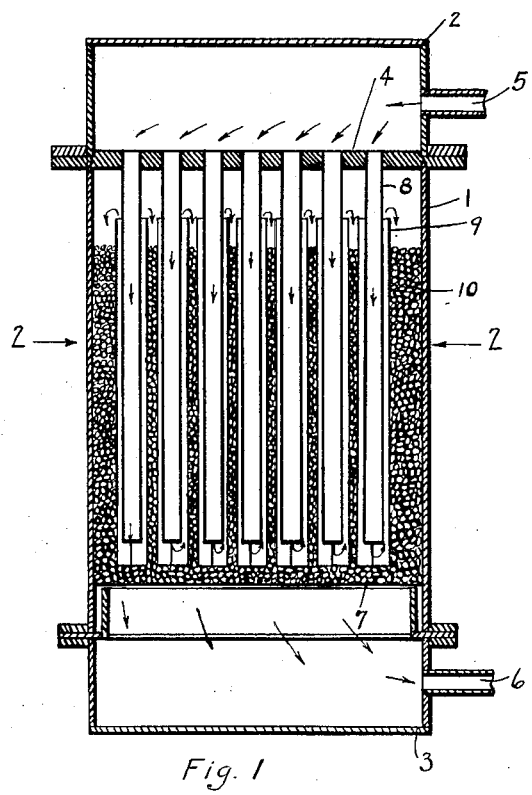
Fig. 1 illustrates a vertical section through a simple converter.
Figure 3:
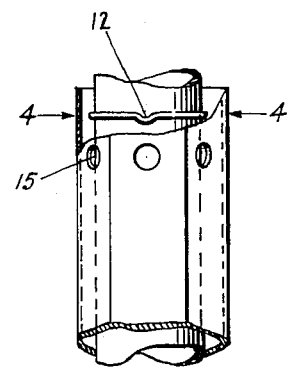
Fig. 3 is a detail of the fastening mechanism which for the sake of simplicity is not shown in Fig. 1.

In Fig. 1 a converter is shown consisting of a shell 1, top piece 2, bottom piece 3, upper tube sheet 4, catalyst retaining screen 7, gas inlet 5, and outlet 6. From the tube sheet 4 depend open end tubes 8 which are preferably circular, surrounded by hexagonal tubes 9. The catalyst is placed around the outside of the hexagonal tubes 9, as indicated at 10.

The fastening of the hexagonal tubes to the round tubes is as follows:—The ring of spring wire 11 provided with a hump 12 is fastened around the round tubes 8, the wire being of such length that the ends do not meet. A rivet 13 with a suitable head is provided at the top of one face of the closed end hexagonal tube. When installing, the round tubes 8 depend from the tube sheet 2 in which they may be fastened in any suitable manner, such as rolling. The catalyst retaining screen 7 and the bottom piece 3 are removed and the hexagonal tubes 9 are shoved up over the tubes 8 until the rivet strikes the wire 11. The hexagonal tubes are then rotated until the rivet registers with a gap 14 between the ends of the wire 11. Then the tube is raised until the rivet is above the wire and rotated until the rivet falls into the depression formed by the hump 12 in the wire 11 where it is securely locked in place. It is readily apparent that it can be easily removed by raising and reversing the procedure described. Holes 15 are preferably formed in the hexagonal tube in order to permit the reaction gases to leave the tube in a horizontal direction. These perforations are desirable but not essential.

In operation, reaction gases enter through the inlet 5 into the top piece 2, then pass down through the tubes 8, reversing their flow at the bottom and flowing up through the annular space between the tubes 8 and the tubes 9, again reversing their flow at the top, and passing down through the catalyst into the bottom piece 3 and out through the outlet pipe 6. The operation, it will be seen, is the same as converters described in the Jaeger and Bertsch application above referred to.

The converter has been shown in the drawings in a purely diagrammatic form, omitting all accessories such as insulation, pyrometers for measuring catalyst and gas temperatures at different levels, catalyst filling holes, and the like. These details of construction, part of which are shown in the Jaeger and Bertsch application and part of which are otherwise well known to the art, have been omitted as they do not in themselves form any part of the present invention but it is understood that a skilled chemical engineer in all cases will use the necessary and suitable accessories in the operation of the converter and will of course adopt the necessary flow modifications and means for introducing auxiliary air or reaction gases which are shown in the various figures of the Jaeger and Bertsch application.

The converters of the present invention are peculiarly suited for the production of contact sulfuric acid, especially when arranged as part of a series of converters described in the Jaeger Patent No. 1,660,511 referred to above. The automatic gas cooling control of the present invention with the hexagonal heat exchange elements is however applicable and important in converters for a large number of catalytic reactions. Thus, for example, these types of apparatus may be satisfactorily used in catalytic reactions, dehydrations, hydrogenations, oxidation, condensations and similar reactions. They may also be used for combined reactions, for high pressure reactions, and for certain special reactions such as the catalytic purification of gases, catalytic removal of poisons, catalytic watergas process, the synthesis of ammonia, the synthesis of hydrocyanic acid and the production of reduction products of oxides of carbon, such as for example, methanol, various motor fuels and the like.

Among the many reactions for which the apparatus is suitable are the reduction of nitro compounds to the corresponding amines, such as for example the reduction of nitro benzol, nitro toluol, nitro phenol, nitro naphthalene, and the like, the production of camphor from borneol, the reduction of phenol to cyclohexanol and naphthalene to tetraline, etc. croton aldehyde to normal butyl alcohol acetaldehyde to ethyl alcohol etc.

Many oxidation reactions are advantageously carried out in the apparatus shown, notably the catalytic oxidation of ammonia to oxides of nitrogen, watergas processes, the purification of coal tar ammonia by catalytic oxidation processes, etc.

While the apparatus can be very satisfactorily used for high pressure catalyses such as the synthesis of methyl alcohol and motor fuels as well as the synthesis of ammonia, I have found that it is a particular advantage of the present invention that some of these reactions, such as for example, the production of motor fuel or methanol may also be carried out at ordinary pressures as the invention permits the accurate thermal control of the reaction.

The converters or converter systems may also be used for embodying very sensitive catalytic reactions such as for example the strongly exothermic oxidation of organic compounds, as for example, the catalytic oxidation of naphthalene to alphanaphthaquinone and phthalic anhydride, toluol, chlor toluols, and nitro toluols and similar derivatives to the corresponding aldehydes and acids, xylenes, mesitylenes, pseudocumenes, paracumenes, etc., to the corresponding aldehydes and acids, production of vanillin and vanillic acid from isoeugenol, the oxidation of methyl alcohol to formaldehyde, ethylenechlorhydrine to chloracetic acid, acenaphthene to naphthalic anhydride, etc.

It should be understood that many of the catalytic reactions referred to above and particularly reductions and hydrogenations may and frequently should be carried out by processes in which a more or less continuous circulation is used. The converter illustrated in the various figures may be easily and simply adapted to circulating processes as will be apparent to the skilled chemical engineer and it will be understood that the present invention can be used in circulation or semicirculation processes of the most diverse character.

What is claimed as new is:

1. An automatically gas cooled converter comprising in combination a catalyst layer, double counter current heat exchanging elements embedded in said catalyst layer consisting in open end tubes extending into concentric tubes having one closed end and being embedded in the catalyst, said closed end tubes possessing hexagonal outer periphery.

2. An automatically gas cooled converter comprising in combination a catalyst layer, double counter current heat exchanging elements embedded in said catalyst layer consisting in open end tubes extending into concentric tubes having one closed end and being embedded in the catalyst, said closed end tubes possessing hexagonal outer periphery, and being so placed that the distance between any point on the periphery of one element and the nearest point on the periphery of any adjacent element is uniform.

Signed at Pittsburgh, Pennsylvania, this 18th day of May, 1928.

FREDERICK A. HODGE.